United States Patent [19]

Moorhead

[11] Patent Number: 4,698,271

[45] Date of Patent: Oct. 6, 1987

[54] COPPER-SILVER-TITANIUM FILLER METAL FOR DIRECT BRAZING OF STRUCTURAL CERAMICS

[75] Inventor: Arthur J. Moorhead, Knoxville, Tenn.

[73] Assignee: The United States of America as represented by the Department of Energy, Washington, D.C.

[21] Appl. No.: 814,942

[22] Filed: Dec. 30, 1985

[51] Int. Cl.$^4$ .............................................. B32B 15/04
[52] U.S. Cl. ................................... 428/621; 228/121; 228/122; 228/263.12; 228/263.21; 420/502; 420/587; 428/472; 428/632
[58] Field of Search ............... 420/502, 587; 428/621, 428/632, 641, 468, 472; 228/121, 122, 263.12, 263.21, 263.19

[56] References Cited

U.S. PATENT DOCUMENTS

| | | | |
|---|---|---|---|
| 2,667,431 | 1/1954 | Burnside | 427/11 |
| 2,739,375 | 3/1956 | Coxe | 420/502 |
| 2,950,189 | 8/1960 | Ames | 420/488 |
| 3,034,205 | 5/1962 | Ames | 428/633 |
| 3,107,756 | 10/1963 | Gallet | 428/552 |
| 3,342,568 | 9/1967 | Capillon | 428/673 |
| 3,382,052 | 5/1968 | Clarke | 428/673 |
| 3,455,663 | 7/1969 | Zdanuk | 420/502 |
| 3,570,110 | 3/1971 | Zdanuk | 428/673 |
| 3,813,258 | 5/1974 | Pieper et al. | 428/671 |
| 4,305,998 | 12/1981 | Manty et al. | 428/661 |
| 4,448,853 | 5/1984 | Fischer et al. | 428/607 |
| 4,471,026 | 9/1984 | Nicholas et al. | 228/263.12 |
| 4,591,535 | 5/1986 | Mizuhara | 428/632 |

FOREIGN PATENT DOCUMENTS 1151666  7/1963  Fed. Rep. of Germany ...... 420/502

OTHER PUBLICATIONS

Schechter, "An Investigation of Enhanced Thermal Barrier Coating Systems for Diesel Engine Components", pp. 107–111, Kamo et al., Cummins/TACOM Advanced Adiabatic Engine, pp. 121, 122, 133, Thrasher, Ceramic Applications in Turbine Engines (CATE) Program Summary, pp. 255–258, all above from 'Proceedings of the Twenty-First Automotive Technology Development Contractors' Coordination Meeting P-138', SAE.

McKisson et al., "High Temperature (1200° C.) Ceramic-to-Metal Seal Development", Atomics International, Canoga Park, CA, Dec. 1972.

Smith, "Ceramic Heat Exchanger Design Methodology", Argonne National Laboratory, Argonne, Illinois, pp. 1, 3 and 5.

Pattee, "Joining Ceramics to Metals and Other Materials", WRC Bulletin, pp. 9–43.

Hill, "Brazing to Metallised Ceramics", Paper No. 2, Post Office Research Centre, Martlesham, Heath, IP5 7RE, pp. 1–12.

Bronnes et al., "Ceramic-to-Metal Bonding with Sputtering as a Metallization Technique", Philips Tech. Rev. 35, No. 7/8, 1975, pp. 209–211.

Mattox, "Metallizing Ceramics Using a Gas Discharge", Journal of the American Ceramic Society—Discussions and Notes, Jul. 1965, pp. 385–386.

Moorhead, "Direct Brazing of Structural Ceramics for Uncooled Diesels", Proceedings of the Twenty-Second Automotive Technology Development Contractors Coordination Meeting, SAE, Mar. 1985, pp. 531–539.

Primary Examiner—L. Dewayne Rutledge
Assistant Examiner—Robert L. McDowell
Attorney, Agent, or Firm—Katherine P. Lovingood; Stephen D. Hamel; Judson R. Hightower

[57] ABSTRACT

A method of joining ceramics and metals to themselves and to one another is described using a brazing filler metal consisting essentially of 35 to 50 atomic percent copper, 15 to 50 atomic percent silver and 10 to 45 atomic percent titanium. This method produces strong joints that can withstand high service temperatures and oxidizing environments.

2 Claims, 2 Drawing Figures

COPPER-SILVER-TITANIUM FILLER METAL FOR DIRECT BRAZING OF STRUCTURAL CERAMICS

BACKGROUND OF THE INVENTION

This invention relates to the development of copper-silver-titanium brazing filler metals (or braze alloys) for direct brazing of ceramics to ceramics or ceramics to metals to form strong joints that can withstand high service temperatures. It was developed under a contract with the United States Department of Energy.

A key technology that will enhance or restrict the use of ceramic materials in high performance applications, such as advanced heat engines or high temperature heat exchangers, is the ability to reliably join simpleshape ceramic components to form complex assemblies or to join unit lengths of ceramic material to form large ceramic systems. Although ceramic joining technology has been highly developed over the past fifty years, very little has been done to develop brazing filler metals for joining ceramics for use at elevated temperatures, at high stress levels and in dirty environments.

There are basically two brazing processes that can be used for joining ceramics. One is indirect brazing in which the ceramic is coated with a metal such as molybdenum or titanium prior to brazing with a nonreactive commercial filler metal. In the widely used moly-manganese process a glassy phase forms a bond with the ceramic and the molybdenum particles that constitute the coating. In other indirect processes, the active metal titanium is applied to the ceramic by vapor deposition or from a slurry containing titanium hydride. The other major ceramic brazing process is direct brazing with filler metals specially formulated to wet and bond to the ceramics. Direct brazing is preferred since it avoids the development and application of what is, in many cases, the very sophisticated and expensive coating or metallizing treatment required for indirect brazing. Also, the inclusion of an active metal such as titanium within the filler metal more effectively protects the active metal from oxidation during storage or while brazing than when the pure active metal is first used to coat the ceramic. Finally, the strength of the bond between a coating and ceramic substrate, and the corrosion resistance of the coating do not have to be of concern in direct brazing.

In spite of the potential advantages of the direct brazing process, there are very few filler metals commercially available that will wet and adhere to structural ceramics. It is difficult to formulate such an alloy since ceramics, and particularly oxide-base ceramics, are notoriously difficult to wet. One filler metal that has been developed to braze ceramics is made by the WESGO Division of GTE Products Corporation and sold under the trade name "Ticusil". This alloy contains 55 at. % silver, 36 at. % copper and 8 at. % titanium. However, the strengths of ceramic-ceramic brazements made with this filler metal tend to be low, and quite variable even within a given brazed sample. Therefore, in order to meet the requirements for joining various ceramics for high performance applications, there is a need to develop filler metals that can wet and strongly adhere to ceramics and also withstand high service temperatures and oxidizing conditions.

SUMMARY OF THE INVENTION

In view of the above-mentioned need, it is an object of this invention to provide brazing filler metals for direct brazing of ceramics and metals to themselves and to one another to form strong joints for use in high-performance applications at elevated temperatures, high stress levels and in oxidizing environments. Other objects and advantages of the invention will be apparent to those skilled in the art from the detailed description and the claims.

The invention is generally described as a method of joining ceramics and metals to themselves and to one another by brazing in a nonoxidizing atmosphere with a filler metal in the composition range of 35 to 50 at. % copper, 15 to 50 at. % silver and 10 to 45 at. % titanium. The invention is also a composite structure having at least two structural components of ceramics and metals joined to themselves or to one another with a brazing filler metal in the composition range of 35 to 50 at. % copper, 15 to 50 at. % silver and 10 to 45 at. % titanium. In addition, the invention is a brazing filler metal consisting essentially of 35 to 50 at. % copper, 15 to 50 at. % silver and 10 to 45 at. % titanium. These filler metals have the advantages of wetting and strongly adhering to ceramics and the capacity to withstand high service temperatures. They also have sufficiently low brazing temperatures ($<1,000°$ C.) to permit direct brazing of thermally sensitive structural materials such as nodular cast iron (NCI) and partially stabilized zirconia (PSZ) without damage to either the iron or the ceramic.

DETAILED DESCRIPTION OF THE PREFERRED EMBODIMENT

Figure 1:
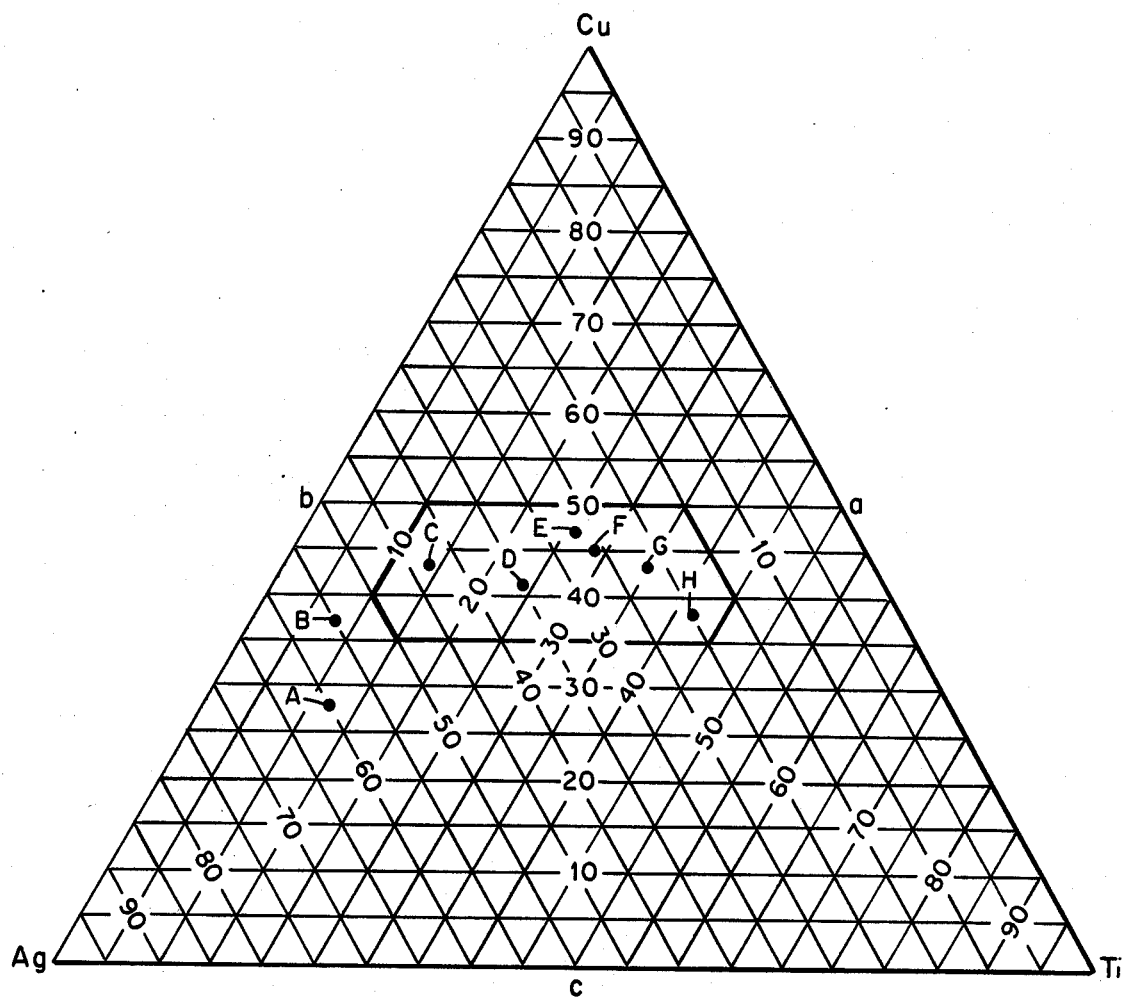
FIG. 1 is a ternary diagram indicating compositions in atomic percent of the alloys of this invention and compositions of two brazing filler metals tested for comparison to the alloys of this invention.

Much work has been done in recent years to develop methods of joining ceramics to ceramics or ceramics to metals for use in high-temperature applications. A preferred technique is direct brazing wherein two components to be joined are brazed together using a filler metal that can wet and adhere to the respective surfaces of the components. One line of development for joining oxide-base ceramics is the use of filler metals containing oxide-forming active elements such as titanium. Oxide-base ceramics to which the brazing filler metals of this invention will adhere include partially stabilized zirconias, high purity high density aluminas, and alumina-matrix composites.

The filler metals studied were made by melt-spinning onto a rapidly rotating stainless steel wheel. Although brazing was done in vacuum ranging from $2 \times 10^{-4}$ mm Hg or lower, this would not preclude brazing in a high-purity, inert gas environment. Filler metals prepared and tested are described in Table 1. The alloys are lower in silver content and higher in titanium content than commercially available Ticusil manufactured by WESGO.

TABLE I

| Filler metal | Content in Atomic % | | |
|---|---|---|---|
| | Cu | Ag | Ti |
| Ticusil | 37 | 55 | 8 |
| MWF-1 | 47 | 27 | 26 |
| MWF-2a | 45 | 26 | 29 |
| MWF-2b | 43 | 22 | 35 |
| MWF-2c | 37 | 20 | 43 |
| MWF-92 | 44 | 43 | 13 |
| MWF-93 | 41 | 35 | 24 |

Filler metals MWF-2a through MWF-2c were prepared from the same alloy ingot but segregation effects in the ingot resulted in differing compositions.

An indication of the ability of a brazing filler metal to form strong joints is the wetting or contact angle that the molten metal makes with the ceramic substrate. Small wetting angles are characteristic of strong joints. This invention provides brazing filler metals with small wetting angles and tests further indicate the strength of the joints formed is high. Sessile drop wettability studies were conducted to study the wetting angle of the brazing filler metals on ceramic substrates as a function of time and temperature. The sessile drop apparatus is essentially a horizontal induction heating furnace, consisting of a fused silica tube 38 mm in diameter and 300 mm long, in which a vacuum of $5 \times 10^{-5}$ mm Hg and temperatures to 1750° C. can be obtained. After each run was made, the sample was removed from the tube, examined with a shadowgraph to measure the degree of wetting (contact angle) and then either sectioned for ceramographic examination or used for determination of the apparent shear strength of the bond between the drop and the ceramic substrate.

Tests to determine the apparent shear strength of the bond between the drop and the ceramic substrate were conducted by a generally accepted method, the Sutton push-off technique. In this test, a projection on a special test fixture in a mechanical test machine shears the solidified sessile drop off the ceramic substrate. The bond strength is calculated from the load at failure divided by the interfacial area. However, in the case of some of these filler metals, the wetting angles are so low that the test apparatus shears through the drop without causing failure at the interface. Therefore, flexural strength measurements were conducted on ceramic-ceramic brazement samples joined with these filler metals. Ceramic coupons were brazed in a butt configuration and then sliced into flexure bars using a diamond abrasive wheel. The specimens were tested in a side-bend configuration in a four-point bend fixture. Both room- and elevated-temperature tests (up to 600° C.) have been conducted.

Example I

Figure 2:
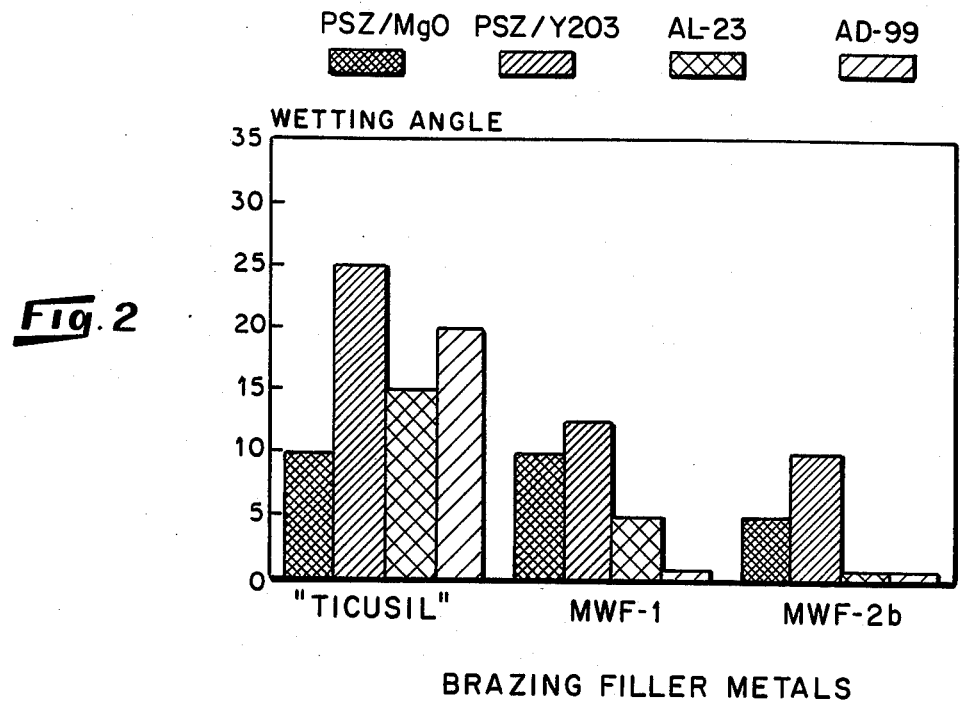
FIG. 2 is bar graph illustrating the superior wetting behavior of two filler metals of this invention compared with commercially available "Ticusil".

Wetting angles on various substrates were measured for filler metals MWF-1 and MWF-2b. Substrates tested are identified in FIG. 2 as PSZ/MgO which is zirconia partially stabilized with magnesium oxide and sold under the trade name Nilsen's MS Grade; PSZ/Y$_2$O$_3$ which is zirconia partially stabilized with diyttrium trioxide made by NGK Spark Plug Co., Japan and sold under the trade name NGK Z-191. AL-23 which is a 99.5% alumina ceramic manufactured by Degussa of the Federal Republic of Germany; and AD-99 which is a 99% alumina ceramic manufactured by Coor's Porcelain Company. FIG. 2 shows the relative wetting behavior of filler metals of this invention and WESGO's Ticusil on various substrates indicating that the filler metals MWF-1 and MWF-2b exhibit superior wetting behavior.

EXAMPLE II

MWF-2b was used in a series of experiments to join zirconia partially stabilized with MgO, (PSZ), having the trade name Nilsen's MS Grade, and various high density, high purity aluminas more specifically described as AD-998 a product of Coor's Porcelain Company having 99.8% Al$_2$O$_3$, and AL-23 a product of Degussa, Federal Republic of Germany, having greater than 99.5% Al$_2$O$_3$. The ceramics were brazed in vacuum in a butt joint configuration in the temperature range 980° C. to 1,090° C. Flexure bars cut from the brazed coupons were tested in four-point bending in air. A summary of brazing conditions, ceramic brazed and flexural strength data is given in Table II.

TABLE II

Summary of flexural strength data for ceramic-ceramic brazements made with experimental brazing filler metal MWF-2a, Cu—26Ag—29Ti, at. % - all tests in air

| Specimen Number | Temperature (°C.) brazing | Temperature (°C.) test | Number of Specimens | Mean Strength (MPa) | Standard deviation | Location of failure |
|---|---|---|---|---|---|---|
| AD-998 Alumina | | | | | | |
| 414 | 980 | 25 | 4 | 222[c] | 33 | Ceramic |
| 394 | 1000 | 400 | 4 | 215[d] | 37 | Mixed[e] |
| 395 | 1000 | 600 | 4 | 213[d] | 24 | Joint |
| AL-23 Alumina | | | | | | |
| 356 | 1090 | 25 | 4 | 91[c] | 49 | Ceramic |
| 392 | 1000 | 200 | 2 | 145[c] | 1 | Mixed |
| 392 | 1000 | 400 | 2 | 110[c] | 28 | Mixed |
| 415 | 980 | 400 | 4 | 165[d] | 41 | Mixed |
| PSZ (83-064 MS, MgO Stab.) | | | | | | |
| 348 | 1040 | 25 | 4 | 350[c] | 41 | Joint |
| 362 | 1000 | 25 | 4 | 339[c] | 53 | Joint |
| 391 | 1000 | 200 | 2 | 159[c] | 26 | Joint |
| 391 | 1000 | 400 | 2 | 132[c] | 70 | Joint |
| Sintered α-SiC | | | | | | |
| 433 | 1000 | 25 | 3 | 81[f] | 21 | Joint |

[a]All brazing in vacuum of $<5 \times 10^{-5}$ mm Hg at start of cycle, $2 \times 10^{-4}$ mm Hg at temperature.
[b]30 min. at temperature prior to testing
[c]Crosshead speed of 0.085 mm/s, 4-point bend, 6.35- and 25.4-mm spans.
[d]Load rate of 22.7 kg/s, 4-point bend, 6.35- and 19.0-mm spans.
[e]Some samples failed in braze joint, others in ceramic.
[f]Crosshead speed of 0.085 mm/s, 4-point bend, 6.35- and 19.0-mm spans.

Outstanding strength values were achieved at a brazing temperature of 1,000° C. or below for test temperatures up to 600° C. This temperature is 250° C. above the expected service temperature at the interface between a ceramic piston cap and nodular cast iron piston in the uncooled diesel engine. In some cases failure occurred in the ceramic, and in some cases there was "mixed" failure. For comparison purposes, the room temperature flexural strength of AD-998 alumina is about 210 MPa (30.5 ksi), of Degussit AL-23 alumina is 155 MPa (22.5 ksi) and of PSZ is 600 MPa (87 ksi).

The SiC data is included to show that this filler metal also has significant promise for brazing SiC. Although the flexural strength is relatively low (81 MPa), it is still twice that of a braze material used in industry to join silicon carbide.

Air-oxidation tests were conducted on ceramic specimens brazed with the MWF-2b filler metal. Air exposure was used as air is more oxidizing than the atmosphere in an engine combustion chamber. The specimens were held for over 5,000 hours at 500° C. A tightly adhering oxide film formed on the surface, and there was no catastrophic oxidation.

EXAMPLE III

This experiment was conducted to determine if either the 1,000° C. brazing temperature, or exposure to an active-element-containing filler metal, were harmful to the mechanical properties of either the NCI piston material or the PSZ ceramic. The iron undergoes a typical allotropic phase transformation on heating above about 750° C. The PSZ is susceptible to an overaging phenomena at elevated temperatures.

Bar/pad shear test specimens were brazed with MWF-2b. The bars were nodular cast iron (NCI) or type 446 stainless steel (more specifically described as a ferritic stainless steel containing about 25 wt. % chromium). Type 446 stainless steel is a potential transition material for accommodating mismatches in coefficients of thermal expansion between NCI and PSZ. The pads were MgO-stabilized PSZ. The metal bars had dimensions of 3.18×9.52 mm and overlapped the ceramic pad by 6.35 mm. The PSZ pad was 9.52×9.52×7.62 mm. Brazing was conducted in the temperature range 920° C. to 1,000° C. under a vacuum of $5 \times 10^{-5}$ mm Hg.

The PSZ ceramic was emphasized in these experiments since PSZ has low thermal conductivity and is therefore most desirable to insulate the combustion chamber in the uncooled diesel engine. Room temperature shear strengths for these brazements averaged an outstanding 200 MPa (29 ksi). Also significant was the finding that the microstructure of the NCI material after brazing was very similar to that of the as-received iron, and the hardness of the NCI was not reduced by this thermal cycle, an important factor in engine design.

Other experiments demonstrated that the PSZ is not harmed by brazing with this filler metal. The flexural strength and fracture toughness of the PSZ material was 652±44 MPa and 11.5±0.8 MPa·m½, respectively, after brazing as compared to 704±2 MPa and 14±2 MPa·m½ for the unbrazed materials. These differences are not considered to be significant as far as use of this ceramic in an uncooled diesel engine is concerned.

EXAMPLE IV

Fracture toughness of ceramic joints was examined since the fracture toughness of a braze joint (and particularly of ceramic braze joints) is increasingly considered to be a critical parameter for the design of components. The results were very encouraging considering the critical fracture toughness of the samples brazed with MWF-1 was at least as great as that of the bulk ceramic indicating that the brazement would not be a "weak link" in the system, see Table III.

TABLE III

Fracture toughness of brazements in PSZ ceramic[a] joined with experimental brazing filler metal MWF-1 Cu—27Ag—26Ti, at. %

| Specimen number | Brazing temperature (°C.) | Time at temperature (min) | Fracture toughness (MPa · m½) |
|---|---|---|---|
| 103 | 1010 | 5 | 7.2 |
| 104 | 1010 | 5 | 6.6 |
| 105 | 1040 | 4 | 5.9 |
| 107 | 1010 | 20 | 6.1 |

[a]Nilsen 82-94159N having fracture toughness of 6.0 MPa · m½.

EXAMPLE V

MWF-92 and MWF-93 were used in a series of sessile-drop experiments test wetting angle and shear strength on Degussit AL-23 alumina and a ceramic-matrix composite of alumina reinforced with silica whiskers. The results are given in Table IV.

TABLE IV

Wetting and bonding behavior of two experimental brazing filler metals on structural ceramics.

| Specimen Number | Brazing Temperature (°C.) | Wetting Angle | Shear Strength (MPa) |
|---|---|---|---|
| Brazing filler metal: MWF-92 Cu—43Ag—13Ti Ceramic Substrate: Degussit AL-23 Alumina | | | |
| 490.4 | 800 | 60 | 110 |
| 491.4 | 850 | 30 | 81 |
| 493.5 | 850 | 30 | 73 |
| 493.6 | 850 | 30 | 71 |
| Brazing filler metal: MWF-93 Cu—35Ag—24Ti Ceramic Substrate: Degussit AL-23 Alumina | | | |
| 490.5 | 800 | — | 28 |
| 488.4 | 850 | 22 | — |
| Brazing filler metal: MWF-93 Cu—35Ag—24Ti Ceramic Substrate: $Al_2O_3$ + 10 vol. % SiC whiskers | | | |
| 509.6 | 850 | 40 | 95 |

The results of the tests described in Examples I through V indicate that these experimental filler metals are very viable candidates for direct brazing of insulating ceramics to NCI components of the uncooled diesel engine. The brazing temperatures are suitable for joining NCI, stainless steel and various ceramics, and the joints thus formed exhibit high strength as well as effective resistance to oxidation at temperatures of at least 500° C. MWF-1, MWF-2a, MWF-2b and MWF-2c exhibited better wetting angles an shear strength than the MWF-92 and MWF-93 alloys having higher silver content, although the high silver alloys still have wetting angles considerably less than 90°.

The compositional range of the Cu-Ag-Ti alloys claimed is schematically indicated with a heavy line in FIG. 1 and embraces the compositions MWF-1 (Point E), MWF-2a (Point F), MWF-2b (Point G), MWF-2c (Point H), MWF-92 (Point C) and MWF-93 (Point D). In comparison, brazing with an alloy designated Point A on FIG. 1 and having a composition of 28Cu-60Ag-12Ti resulted in braze joints between nodular cast iron and partially stabilized zirconia having shear strengths of only 72 MPa and 3 MPa in two tests, considerably lower than the alloys having low silver content. The composition of Ticusil is indicated at Point B. Flexural strength data for AD-998 alumina samples brazed at two temperatures with Ticusil are given in Table V. Although these brazements were excellent in appearance, they were inferior to samples brazed with filler metals MFW-2a (Table 11) from the standpoint of both overall low strength as well as wide variation from sample to sample.

TABLE V

Flexural strength of ceramic-ceramic brazements joined with commercial brazing filler metal

| Sample No. | Temperature (°C.) | | Flexural strength[c] | |
|---|---|---|---|---|
| | Brazing[a] | Test[b] | (MPa) | (ksi) |
| AD-998 brazed ceramic brazed with Ticusil | | | | |
| 522.1 | 900 | 25 | 114 | 16.5 |
| 522.2 | 900 | 25 | 62 | 9.0 |
| 522.3 | 900 | 400 | 62 | 9.0 |
| 522.4 | 900 | 400 | 82 | 11.9 |

TABLE V-continued

Flexural strength of ceramic-ceramic brazements joined with commercial brazing filler metal

| Sample No. | Temperature (°C.) Brazing[a] | Temperature (°C.) Test[b] | Flexural strength[c] (MPa) | Flexural strength[c] (ksi) |
|---|---|---|---|---|
| 526.1 | 950 | 25 | 42 | 6.1 |
| 526.2 | 950 | 25 | 153 | 22.2 |
| 526.3 | 950 | 400 | 237 | 34.4 |
| 526.4 | 950 | 400 | 40 | 5.8 |

[a] Brazed in vacuum of <1 mPa (<9 × $10^{-6}$ mm Hg).
[b] Samples held for 30 minutes at temperature in air prior to test loading.
[c] Loading rate 22 kg/s.

I claim:

1. A method of joining components made of ceramics or metals comprising assembling surfaces of components to be joined in an abutting relationship with a brazing filler metal disposed therebetween, said brazing filler metal consisting of 35 to 50 atomic percent copper, 15 to 50 atomic percent silver and 10 to 45 atomic percent titanium, heating the resulting assembly to a brazing temperature the range of 900° C. to 1000° C. under nonoxidizing conditions and cooling the resulting braze joint.

2. A composite body comprising at least two structural components of ceramics or metals joined with brazing filler metal disposed therebetween consisting of 35 to 50 atomic percent copper, 15 to 50 atomic percent silver and 10 to 45 atomic percent titanium.

* * * * *